Jan. 19, 1965
C. R. PAINTIN
3,166,218
AUTOMATIC GRAIN FEED CONTROL
Filed June 10, 1963
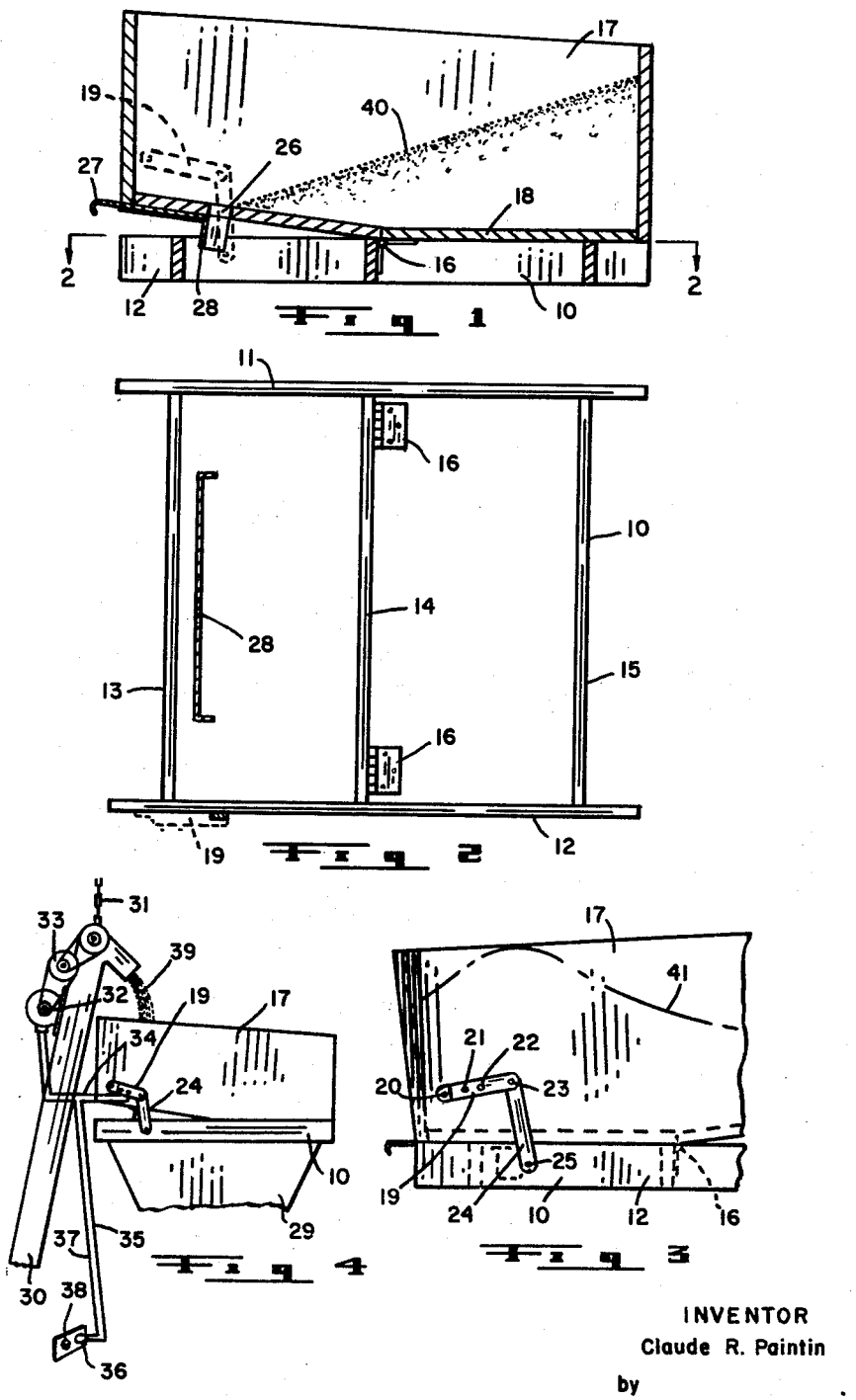
INVENTOR
Claude R. Paintin
by
*Walter C. Briggs*
Atty.

3,166,218
AUTOMATIC GRAIN FEED CONTROL
Claude R. Paintin, P.O. Box 579, Souris,
Manitoba, Canada
Filed June 10, 1963, Ser. No. 286,802
3 Claims. (Cl. 222—56)

This invention relates to the handling of grains, such as wheat, oats, barley and flax, which can be passed through different machines, such as grain cleaners, fanning mills, choppers, etcetera, for various results, such as separations and treatments. All such operations require steady hopper feeding. When large quantities of such grains are to be so handled, power operated augers, endless belts, or other types of conveyors are used to keep said hoppers supplied, but they require constant supervision to insure trouble free operation, especially prevention of overflow.

The principal object of the present invention is to provide a feeder control, which will receive a continuous flow of grain from a power operated conveyor and regulate the outflow feed to the treating machine, preventing hopper overflow by automatically and intermittently stopping and starting the conveyor, thus permitting automatic operation without supervision.

A further, more specific object of the invention is to construct a hopper for back and forth pivoting movement by gravity, according to the amount and position of the grain therein, and such that said back and forth movements will control the above mentioned operation of the supply conveyor to said hopper.

A still further object of the invention is to erect said hopper on an independent portable framework, to provide a feed hopper unit which can be lifted onto various grain treating machines for the above automatic grain feed control thereto.

With the above important and other minor objects in view, which will become more apparent as the description proceeds, the invention consists essentially in the design, construction and arrangement of the various parts hereinafter more particularly described, reference being had to the accompanying drawings wherein like characters of reference indicate corresponding parts in the several figures, and wherein:

FIGURE 1 is a vertical longitudinal section through the hopper and the hinge supporting framework therefor.

FIGURE 2 is a horizontal section taken on the line 2—2, of FIGURE 1.

FIGURE 3 is a partial side view of the framework and hopper, with the hopper tilted on the opposite end to that shown in FIGURE 1.

FIGURE 4 is a reduced side view of a supported hopper, being filled by a power driven elevator, and a diagrammatical showing of the wiring therebetween.

A framework 10 is best shown in FIGURE 2, and comprises a pair of side runners 11 and 12, interconnected by three cross members 13, 14 and 15, suitable means (not shown) being provided to hold said parts together, such as nails, screws, glue, mortises, or the like. The central cross member 14, on one side thereof, is provided with a pair of spaced butt hinges 16, one leaf of each being secured to the cross member, while the other leaves can be swung up to horizontal position for fastening to and supporting a hopper 17, now to be described.

The hopper 17 is a rectangular-shaped box which, in the present instance, completely overlies the framework 10. The bottom 18 of this box is formed in a slight funnel-shaped trough thereacross. The fastened leaves of the hinges 16 are secured along the trough bottom, at one side of centre, so the whole hopper can rock on said hinges, from a contact position of one bottom end with the framework to contact of the other bottom end therewith.

A mercury electric switch is indicated at 19, and one end thereof is pivotally mounted at 20 to one side of the hopper 17. As the operation of a mercury switch is so simple and well known, the details of same have not been shown in the drawings, other than the connecting terminals 21 and 22. The opposite free end of the mercury switch is pivotally connected at 23 to the upper end of a lever 24, the lower end of which is pivotally connected at 25 to the side of the runner 12. In the hopper positions shown in FIGURES 1 and 4, the mercury in the switch is adapted to connect the terminals 21 and 22, while in the position shown in FIGURE 3, these terminals are disconnected.

A feed opening 26 is provided through one end of the funnel-shaped hopper bottom 18, offset from the trough centre, and a slidable gate 27 is indicated to regulate the flow through this opening, according to the seed grain and the type of treating machine being fed. In order that the grain will fall directly from this opening and not spill out, a guard 28 of horizontal U-shape is secured to the hopper bottom, around the opening 26.

The operation of the automatic feeder is clear in FIGURE 4, where the unit is shown supported on a grain treating machine 29. A grain elevator 30 is positioned for grain elevation from a lower bin (not shown) to the feed opening end of the hopper, the upper head of the said elevator being supported by a chain 31. An electric motor 32 drives this elevator through the reduction mechanism indicated at 33. In this figure it will be seen that a wire 34 connects the terminal 21 with the motor 32. A wire 35 connects the terminal 22 with a plug 36, and a wire 37 connects the opposite side of the motor with the same plug. This latter plug is manually inserted into a well known electric outlet, indicated at 38.

In FIGURE 4 it will be seen that the motor is operating the elevator, and a stream of grain 39 is being ejected therefrom into the hopper 17. In FIGURE 1 it will be observed that the weight and position of the grain 40 therein is holding the hopper in the position shown. As the stream of grain 39 continues, the left hand side of the hopper fills up, as indicated by the dot and dash line 41 in FIGURE 3, and as the centre of gravity of the hopper will now pass to this side, the hopper pivots or tips on the hinges 16 to the position shown in this latter figure. In doing so, the mercury switch 19 reverses its angular position from that shown in FIGURE 1, and accordingly disconnects the terminals 21 and 22, and the elevator motor stops.

During the above operations, the grain 40 in the hopper is steadily feeding out the opening 26 by gravity, and through the guard 28 to the lower treating machine 29, regulated by the gate 27. This feed should be set at the correct amount for said machine to handle. However, the amount of grain being lifted by the elevator is much greater than this lower feed, so the hopper fills faster, as mentioned above. When the hopper tips or rocks and stops the elevator, as explained, the above feed through the opening 26 continues, until the centre of gravity of the hopper shifts from the left side to the right, and so causes the hopper to reverse rock to the position shown in FIGURE 1. In this latter movement, the mercury switch also changes or reverses its angle, and reconnects the terminals 21 and 22, and the elevator motor operates to fill up the left side of the hopper.

From the above disclosure it will be seen that I have designed and produced a small portable hopper rocking unit, which can be manually lifted onto various grain treating machines, to automatically maintain a steady flow of grain into said machine, thus eliminating large elevated feed bins or hoppers, and releasing the operator's supervising time for other chores. As the grain can be elevated from lower bins, as required by the grain treating machine being fed, the floor space around the treating machine is not cluttered, and a minimum of electric power is consumed.

While I have directed this disclosure to the construction of a portable feed hopper unit, it will be appreciated that this rocking, switch controlling, hopper could be permanently built onto any specific grain treating machine and obtain the same efficient automatic grain feed control.

What I claim as my invention is:

1. An automatic feed control for grain, comprising: a grain holding hopper; hinge means on the bottom of said hopper for rocking movement thereof; said hopper normally tipped in one of its rockable positions; power means for delivering grain up and into the elevated end of said tipped hopper, to change the center of gravity thereof and tip said hopper on the hinge means into the other rockable position; control means operable by said rocked hopper to stop said power means, and therefore the grain delivery to said hopper; an opening in the bottom of said hopper, at said grain receiving end thereof, for outflow of grain therefrom; and the center of gravity of said hopper changeable with said outflow of grain, when the power means is stopped, to rock the hopper back to its original position, including the actuation of the control means to re-start the delivery of grain to the hopper by the power means.

2. An automatic feed control for grain, comprising: a grain holding hopper; hinge means on the bottom of said hopper for rocking movement thereof; said hopper normally tipped in one of its rockable positions; power operable conveyor means for delivering grain up and into the elevated end of the tipped hopper, to change the center of gravity thereof and tip the hopper back on said hinge means into its other rockable position; switch means operable by said rocking movement to stop the operating power of said conveyor, and therefore the grain delivery to the hopper; an adjustable opening in the bottom of the hopper, at said grain receiving end, for regulating the outflow of grain therefrom; and the center of gravity of the hopper movable, with said outflow of grain therefrom when said operating power is stopped, to rock the hopper back to its original position, including the turning on of said operating power to re-start the grain delivery to the hopper by the conveyor means.

3. A portable feed control for grain, comprising: an open framework; a grain holding hopper; hinge means between said framework and the bottom of said hopper, for support and rocking movement of the hopper thereon; said hopper normally tipped in one rockable position on the framework; the elevated end of the tipped hopper adapted for reception of grain thereto to change the center of gravity of the hopper to the other side of the hinge means and tip said hopper into its other rockable position; mechanical means between the hopper and the framework, and operable by one of said rocking movements, to disconnect the terminals of an electric switch thereon; an adjustable opening in the bottom of the hopper, at said grain receiving end, for regulating outflow of grain from said hopper; said center of gravity of the hopper adapted to move back during said outflow of grain and said terminals are disconnected, to rock the hopper back to its original position on the framework, including the reconnection of said terminals by said mechanical means.

References Cited by the Examiner
UNITED STATES PATENTS

| 2,381,505 | 8/45 | Lindholm | 222—56 |
| 2,408,221 | 9/46 | Michel | 222—56 |
| 2,983,325 | 5/61 | Moody | 222—56 X |
| 3,107,819 | 10/63 | Black et al. | 222—55 |

LOUIS J. DEMBO, *Primary Examiner.*